US011862179B2

(12) United States Patent
Arya et al.

(10) Patent No.: US 11,862,179 B2
(45) Date of Patent: Jan. 2, 2024

(54) SYSTEMS AND METHODS FOR DETECTING MANIPULATED VOCAL SAMPLES

(71) Applicant: Capital One Services, LLC, McLean, VA (US)

(72) Inventors: Sahana Arya, Edison, NJ (US); Alana Alfeche, Aurora, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 211 days.

(21) Appl. No.: 17/220,267

(22) Filed: Apr. 1, 2021

(65) Prior Publication Data
US 2022/0319523 A1 Oct. 6, 2022

(51) Int. Cl.
G10L 17/26 (2013.01)
G06F 21/32 (2013.01)
G10L 25/12 (2013.01)

(52) U.S. Cl.
CPC ............. *G10L 17/26* (2013.01); *G06F 21/32* (2013.01); *G10L 25/12* (2013.01)

(58) Field of Classification Search
None
See application file for complete search history.

(56) References Cited

U.S. PATENT DOCUMENTS 6,839,673 B1 * 1/2005 Choi .................... G10H 1/0041
704/E19.001
7,693,965 B2 * 4/2010 Rhoads .................. G07F 7/086
709/227
8,260,067 B2   9/2012 Shi et al.
9,177,561 B2   11/2015 Bradley et al.
2007/0116242 A1 * 5/2007 Chen ...................... H04Q 1/453
379/283
2009/0132547 A1 * 5/2009 Rhoads .............. H04N 1/00079
709/227

(Continued)

OTHER PUBLICATIONS

Chauhan, Nagesh Singh, "Audio Data Analysis Using Deep Learning with Python (Part 1)," KDnuggets (https://www.kdnuggets.com/2020/02/audio-data-analysis-deep-learning-python-part-1.html) (Feb. 2020).

(Continued)

*Primary Examiner* — Sonia L Gay
(74) *Attorney, Agent, or Firm* — TROUTMAN PEPPER HAMILTON SANDERS LLP; Christopher J. Forstner; John A. Morrissett

(57) ABSTRACT

A system may receive a communication from a user, which may include a vocal sample. The system may transform the vocal sample from a wavelength domain into a frequency domain. The system may determine a divergence of one or more amplitude values of the transformed frequency domain from a predetermined frequency distribution. According to some embodiments, the predetermined frequency distribution may be a Benford's distribution. When the divergence exceeds a predetermined threshold, the system may execute one or more security measures. The one or more security measures may include (i) transferring the user from an automated operator to a human operator, (ii) requiring second factor authentication from the user, and/or (iii) denying a user-initiated request.

20 Claims, 7 Drawing Sheets

(56) References Cited

U.S. PATENT DOCUMENTS

| | | | | |
|---|---|---|---|---|
| 2011/0131044 A1* | 6/2011 | Fukuda | ............... | G10L 21/028 |
| | | | | 704/E17.001 |
| 2018/0278647 A1* | 9/2018 | Gabaev | ............... | H04L 63/1425 |
| 2018/0342257 A1* | 11/2018 | Huffman | ............... | G10L 15/063 |
| 2021/0210113 A1* | 7/2021 | Li | ............... | G10L 15/02 |
| 2022/0027442 A1* | 1/2022 | Militello | ............. | G06Q 20/206 |
| 2023/0042020 A1* | 2/2023 | Gustof | ............... | H04M 7/0075 |

OTHER PUBLICATIONS

Roberts, Leland, "Understanding the Mel Spectogram," Analytics Vidhya (https://medium.com/analytics-vidhya/understanding-the-mel-spectrogram-fca2afa2ce53) (Mar. 5, 2020).

* cited by examiner

SYSTEMS AND METHODS FOR DETECTING MANIPULATED VOCAL SAMPLES

FIELD

The disclosed technology relates to systems and methods for detecting manipulated vocal samples, and more particularly systems and methods for transforming an audio sample from a wavelength domain into a frequency domain, determining a first digit frequency count for one or more amplitudes associated with the transformed audio sample, and determining whether the first digit frequency count diverges beyond a predetermined threshold from a predetermined frequency distribution.

BACKGROUND

Many organizations utilize service representatives to interact with users in order to resolve user issues. These organizations often rely on call centers staffed with numerous human representatives, which may be both cost inefficient for the organization and time inefficient for users who have to wait on hold for a human representative to assist them. Accordingly, many organizations have attempted to automate the user issue resolution process by leveraging interactive voice response (IVR) systems. However, newly developed voice alternation techniques allow bad actors to fraudulently impersonate a user and allow bad actors access to private data associated with the user's account. Current automated IVR systems have no way of detecting potentially altered vocal samples to prevent fraudulent access to a user account.

Benford's law, also known as the law of anomalous numbers, is an observation about the frequency distribution of leading digits in real-world sets of numerical data. Benford's law states that the leading digit in a real-world data set follows a particular distribution, with the digit "1" being the most common leading digit, the digit "2" being the second most common, and so on, with the digit "9" being the least common leading digit. Benford's law is an empirical distribution of leading digits that may be used to analyze many different types of data sets for fraud and/or manipulation. However, current fraud detection systems have not utilized Benford's law to detect manipulated vocal samples.

Accordingly, there is a need for more robust systems capable of detecting manipulated vocal audio to prevent fraudulent access to private information in an IVR system. Embodiments of the present disclosure are directed to this and other considerations.

SUMMARY

Disclosed herein are systems and methods for detecting manipulated vocal audio. Consistent with the disclosed embodiments, a system is provided detecting manipulated vocal audio. The system includes one or more processors and memory in communication with the one or more processors and storing instructions that, when executed by the one or more processors, cause the system to perform one or more steps of a method. The system may receive a communication from a user, which may include a first utterance of a user. The system may transform the utterance from a wavelength domain to a frequency domain. The system may determine a divergence of one or more amplitude values of the transformed frequency domain from a predetermined frequency distribution. When the divergence exceeds a predetermined threshold, the system may execute one or more security measures.

Consistent with the disclosed embodiments, a computer implemented method for detecting manipulated vocal audio is disclosed. The method may include receiving a first vocal sample associated with a user. The method may include transforming the first vocal sample from a wavelength domain into a frequency domain. The method may include determining a first digit frequency distribution of a plurality of amplitudes associated with the transformed vocal sample. The system may include calculating a divergence between the first digit frequency distribution and a predetermined frequency distribution. The method may include determining that the first vocal sample is manipulated when the divergence exceeds a predetermined threshold. The method may include executing one or more security measures in response to determining that the first vocal sample is manipulated.

Consistent with the disclosed embodiments, another computer implemented method for detecting manipulated vocal audio is disclosed. The method may include receiving a first vocal sample associated with a user. The method may include performing a Fourier transformation of the first vocal sample from a wavelength domain into a frequency domain. The method may include determining a first digit frequency count for a plurality of amplitudes associated with the transformed first vocal sample. The method may include calculating a divergence between the determined first digit frequency count and a Benford's distribution. The method may include determining that the first vocal sample is manipulated when the divergence exceeds a predetermined threshold. The method may include executing one or more security measures in response to determining that the first vocal sample is manipulated.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
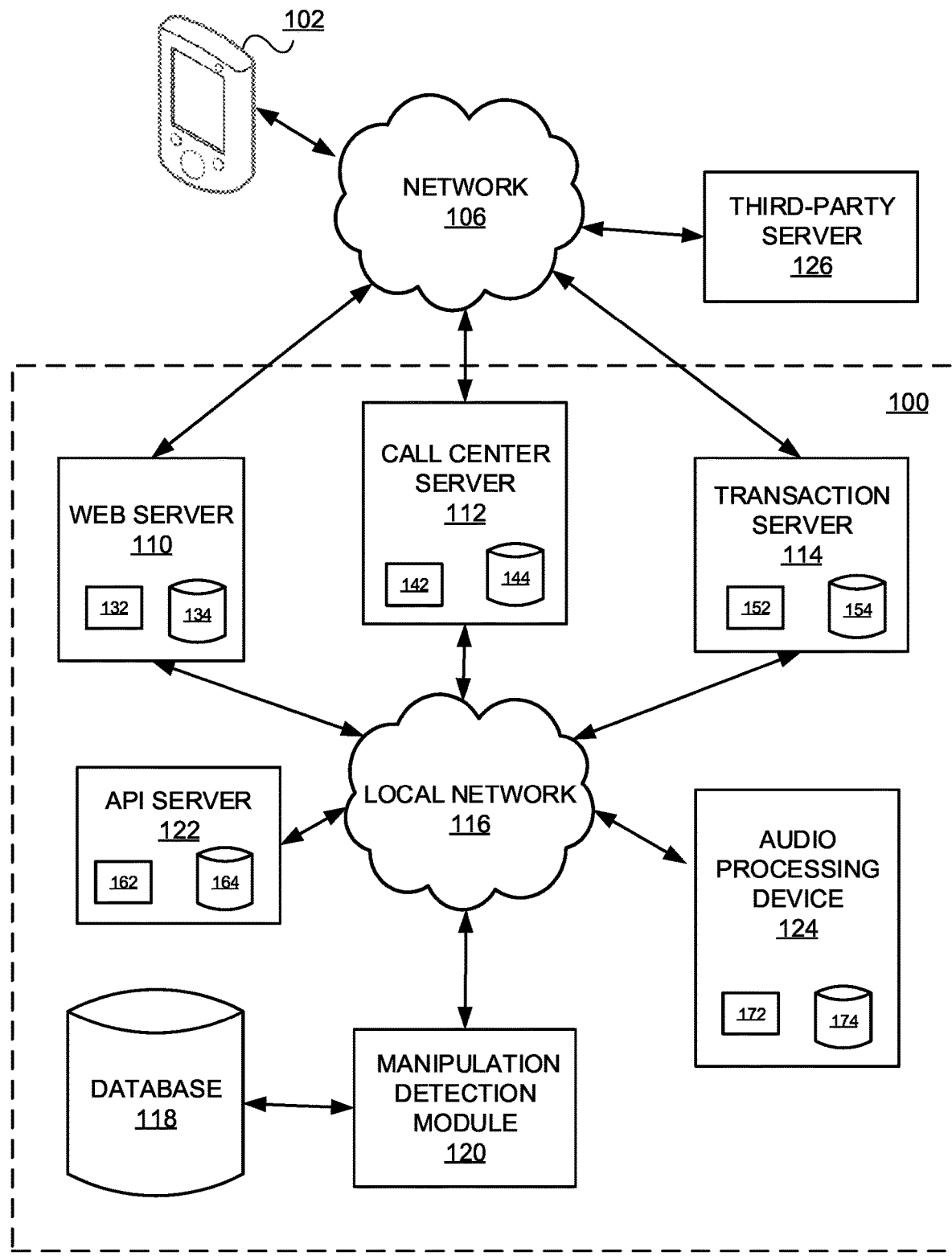
FIG. 1 is a block diagram of an example system 100 that may be used to detect manipulated vocal audio, according to example implementations of the disclosed technology.

FIG. 1 is a block diagram of an example system 100 that may be used to detect a manipulated vocal sample by transforming a given vocal sample from a wavelength domain into a frequency domain and comparing a distribution of leading digits of amplitudes in the frequency domain to a predetermined frequency. The system 100 may be configured to perform one or more processes that enable the detection of manipulated vocal samples, including calculating Fourier transforms of vocal samples in substantially real-time, converting the transformed vocal samples into spectrogram representation, and comparing the leading digit of amplitude distributions in the frequency domain to a predetermined frequency distribution. The components and arrangements shown in FIG. 1 are not intended to limit the disclosed embodiments as the components used to implement the disclosed processes and features may vary. As shown, system 100 may interact with a user device 102 via a network 106. In certain example implementations, the system 100 may include a web server 110, a call center server 112, a transaction server 114, a local network 116, a manipulation detection module 120, a database 118, an API server 122, and an audio processing device 124.

In some embodiments, a user may operate the user device 102. The user device 102 can include one or more of a mobile device, smart phone, general purpose computer, tablet computer, laptop computer, telephone, PSTN landline, smart wearable device, voice command device, other mobile computing device, or any other device capable of communicating with the network 106 and ultimately communicating with one or more components of the system 100. In some embodiments, the user device 102 may include or incorporate electronic communication devices for hearing or vision impaired users.

Users may include individuals such as, for example, subscribers, clients, prospective clients, or customers of an entity associated with an organization, such as individuals who have obtained, will obtain, or may obtain a product, service, or consultation from an entity associated with the system 100. According to some embodiments, the user device 102 may include an environmental sensor for obtaining audio or visual data, such as a microphone and/or digital camera, a geographic location sensor for determining the location of the device, an input/output device such as a transceiver for sending and receiving data, a display for displaying digital images, one or more processors including a sentiment depiction processor, and a memory in communication with the one or more processors.

The network 106 may be of any suitable type, including individual connections via the internet such as cellular or WiFi networks. In some embodiments, the network 106 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 106 may include any type of computer networking arrangement used to exchange data. For example, the network 106 may be the Internet, a private data network, virtual private network using a public network, and/or other suitable connection(s) that enable(s) components in the system 100 environment to send and receive information between the components of the system 100. The network 106 may also include a public switched telephone network ("PSTN") and/or a wireless network.

In accordance with certain example implementations, a third-party server 126 may be in communication with the system 100 via the network 106. In certain implementations, the third-party server 126 can include a computer system associated with an entity (other than the entity associated with the system 100 and its customers) that performs one or more functions associated with the customers. For example, the third-party server 126 can include an automated teller machine (ATM) system that allows a customer to withdraw money from an account managed via an organization that controls the system 100. As another example, the third-party server 126 may include a computer system associated with a product repair service that submits a warranty claim for a product that a customer purchased from the organization that controls the system 100.

The system 100 may be associated with and optionally controlled by an entity such as a business, corporation, individual, partnership, or any other entity that provides one or more of goods, services, and consultations to individuals such as users or customers. The system 100 may include one or more servers and computer systems for performing one or more functions associated with products and/or services that the organization provides. Such servers and computer systems may include, for example, the web server 110, the call center server 112, and/or the transaction server 114, as well as any other computer systems necessary to accomplish tasks associated with the organization or the needs of users (which may be customers of the entity associated with the organization). The web server 110 may include a computer system configured to generate and provide one or more websites accessible to users, as well as any other individuals involved in an organization's normal operations. The web server 110, for example, may include a computer system configured to receive communications from the user device 102 via for example, a mobile application, a chat program, an instant messaging program, a voice-to-text program, an SMS message, email, or any other type or format of written or electronic communication. The web server 110 may have one or more processors 132 and one or more web server databases 134, which may be any suitable repository of website data. Information stored in the web server 110 may be accessed (e.g., retrieved, updated, and added to) via the local network 116 (and/or the network 106) by one or more devices (e.g., manipulation detection module 120 and/or the audio processing device 124) of the system 100. In some embodiments, one or more processors 132 may be used to implement an automated natural language dialogue system that may interact with a user via different types of communication channels such as a website, mobile application, instant messaging application, SMS message, email, phone, or any other type of spoken or written electronic communication. When receiving an incoming message from, for example, the user device 102, the web server 110 may be configured to determine the type of communication channel the user device 102 used to generate the incoming message.

The call center server 112 may include a computer system configured to receive, process, and route telephone calls and other electronic communications between a user operating a user device 102 and the manipulation detection module 120. The call center server 112 may have one or more processors 142 and one or more call center databases 144, which may be any suitable repository of call center data. Information stored in the call center server 112 may be accessed (e.g., retrieved, updated, and added to) via the local network 116 (and/or network 106) by one or more devices of the system 100. In some embodiments, the call center server processor 142 may be used to implement an interactive voice response (IVR) system that interacts with the user over the phone.

The transaction server 114 may include a computer system configured to process one or more transactions involving an account associated with users or customers, or a request received from users or customers. In some embodiments, transactions can include, for example, a product/service purchase, product/service return, financial transfer, financial deposit, financial withdrawal, financial credit, financial debit, dispute request, warranty coverage request, shipping information, delivery information, and any other type of transaction associated with the products and/or services that an entity associated with system 100 provides to individuals such as customers. The transaction server 114 may have one or more processors 152 and one or more transaction server databases 154, which may be any suitable repository of transaction data. Information stored in transaction server 114 may be accessed (e.g., retrieved, updated, and added to) via the local network 116 (and/or network 106) by one or more devices of the system 100.

In some embodiments, the transaction server 114 tracks and stores event data regarding interactions between a third-party, such as a third-party server 126, with the system 100, and on behalf of the individual users or customers. For example, the transaction server 114 may track third-party interactions such as purchase requests, refund requests, shipping status, shipping charges, warranty claims, account withdrawals and deposits, and any other type of interaction that the third-party server 126 may conduct with the system 100 on behalf of an individual such as a user or customer.

The local network 116 may include any type of computer networking arrangement used to exchange data in a localized area, such as WiFi, Bluetooth™ Ethernet, and other suitable network connections that enable components of the system 100 to interact with one another and to connect to the network 106 for interacting with components in the system 100 environment. In some embodiments, the local network 116 may include an interface for communicating with or linking to the network 106. In other embodiments, certain components of the system 100 may communicate via the network 106, without a separate local network 116.

In accordance with certain example implementations of the disclosed technology, the manipulation detection module 120, which is described more fully below with reference to FIG. 2, may include one or more computer systems configured to compile data from a plurality of sources, such as the web server 110, the call center server 112, the transaction server 114, and/or the database 118. The manipulation detection module 120 may correlate compiled data, analyze the compiled data, arrange the compiled data, generate derived data based on the compiled data, and store the compiled and derived data in a database such as the database 118. According to some embodiments, the database 118 may be a database associated with an organization and/or a related entity that stores a variety of information relating to users, customers, transactions, and business operations. The database 118 may also serve as a back-up storage device and may contain data and information that is also stored on, for example, databases 134, 144, 154, 164, 174 (and 260, as will be discussed with reference to FIG. 2). The database 118 may be accessed by the manipulation detection module 120 and may be used to store records of every interaction, communication, and/or transaction a particular user or customer has had with the organization 108 and/or its related entity in the past to enable the creation of an ever-evolving customer context that may enable the manipulation detection module 120, in conjunction with the audio processing device 124, to determine whether a received vocal sample has been manipulated or is associated with an authentic vocal sample that has not been manipulated or deep faked.

In certain example implementations, the API server 122 may include one or more computer systems configured to execute one or more application program interfaces (APIs) that provide various functionalities related to the operations of the system 100. In some embodiments, the API server 122 may include API adapters that enable the API server 122 to interface with and utilize enterprise APIs maintained by an organization and/or an associated entity that may be housed on other systems or devices. In some embodiments, APIs can provide functions that include, for example, retrieving user account information, modifying user account information, executing a transaction related to an account, scheduling a payment, authenticating a user, updating a user account to opt-in or opt-out of notifications, and any other such function related to management of user profiles and accounts. The API server 122 may include one or more processors 162 and one or more API databases 164, which may be any suitable repository of API data. Information stored in the API server 122 may be accessed (e.g., retrieved, updated, and added to) via the local network 116 (and/or network 106) by one or more devices (e.g., manipulation detection module 120) of system 100. In some embodiments, the API processor 162 may be used to implement one or more APIs that can access, modify, and retrieve user account information.

In certain embodiments, real-time APIs consistent with certain disclosed embodiments may use Representational State Transfer (REST) style architecture, and in this scenario, the real time API may be called a RESTful API. In certain embodiments, real-time APIs consistent with the disclosed embodiments may utilize streaming APIs to provide real-time data exchange between various components of the system. While RESTful APIs may provide for a request and response model of data transfer, a streaming API may open a persistent connection between components of the system, and provide data in real-time whenever a state change occurs on a component of the system (e.g., API server 122) to another component of the system (e.g., audio processing device 124, manipulation detection module 120, transaction server 114, call center server 112, and/or web server 110).

In certain embodiments, a real-time API may include a set of Hypertext Transfer Protocol (HTTP) request messages and a definition of the structure of response messages. In certain aspects, the API may allow a software application, which is written against the API and installed on a client (such as, for example, the transaction server 114) to exchange data with a server that implements the API (such as, for example, the API server 122), in a request-response pattern. In certain embodiments, the request-response pattern defined by the API may be configured in a synchronous fashion and may require that the response be provided in real-time. In some embodiments, a response message from the server to the client through the API consistent with the disclosed embodiments may be in formats including, for example, Extensible Markup Language (XML), JavaScript Object Notation (JSON), and/or the like.

In some embodiments, the API design may also designate specific request methods for a client to access the server. For example, the client may send GET and POST requests with parameters URL-encoded (GET) in the query string or form-encoded (POST) in the body (e.g., a form submission). In certain example implementations, the client may send GET and POST requests with JSON serialized parameters in the body. Preferably, the requests with JSON serialized parameters use "application/json" content-type. In another aspect, an API design may also require the server implementing the API return messages in JSON format in response to the request calls from the client.

In accordance with certain example implementations of the disclosed technology, the audio processing device 124 may include a computer system configured to receive and process incoming vocal/audio samples and determine a meaning of the incoming message. In some embodiments, the audio processing device may be further configured to process received audio samples (e.g., vocal commands or requests received from user device 102). For example, audio processing device 124 may be configured to transform the received vocal sample from a wavelength domain into a frequency domain. Audio processing device 124 may achieve the audio transformation by using a Fourier transformation, a short time Fourier transformation, a discrete cosine transformation, or any other suitable method for converting an audio sample from a wavelength domain into a frequency domain.

Audio processing device 124 may be configured to receive commands or requests from a user (e.g., from user device 102). The commands or request may include requesting access to one or more third party servers (e.g., accessing third-party server 126 to authenticate an ATM transaction associated with the third-party server 126), requesting approval of a purchase or transaction (e.g., a transaction initiated with transaction server 124), requesting approval to log into an account associated with the organization (e.g., logging into a secured user account via web server 110), or requesting a service over an automated call or IVR system (e.g., via call center server 112).

The audio processing device 124 may include one or more processors 172 and one or more audio processing databases 174, which may be any suitable repository of audio/vocal sample data. Information stored on the audio processing device 124 may be accessed (e.g., retrieved, updated, and added to) via the local network 116 (and/or network 106) by one or more devices (e.g., the manipulation detection module 120) of system 100. In some embodiments, processor 172 may be used to implement a natural language processing system that can determine the meaning behind a spoken utterance and convert it to a form that can be understood by other devices.

Although described in the above embodiments as being performed by the web server 110, the call center server 112, the transaction server 114, the manipulation detection module 120, the database 118, the API server 122, and the audio processing device 124, some or all of those functions may be carried out by a single computing device.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

Figure 2:
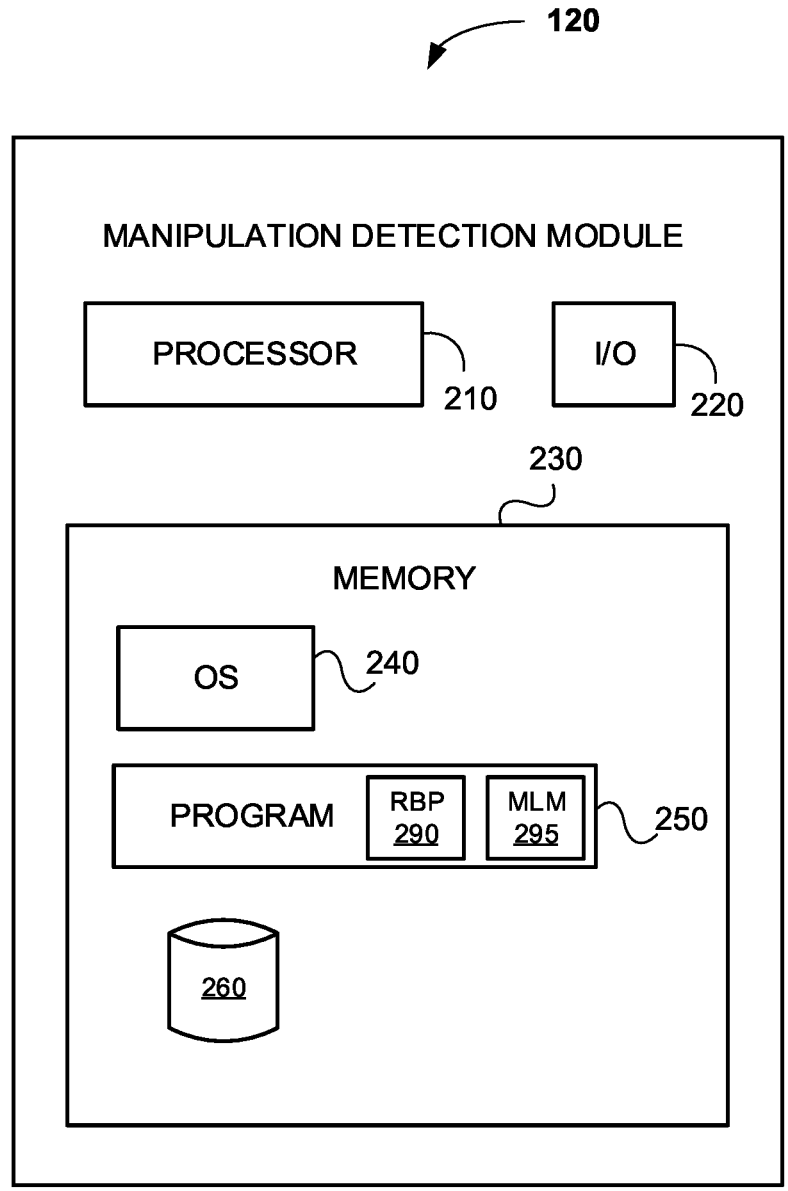
FIG. 2 is a block diagram of an example manipulation detection module 120, as shown in FIG. 1, according to example implementations of the disclosed technology.

FIG. 2 is a block diagram (with additional details) of an example manipulation detection module 120, as also depicted in FIG. 1. According to some embodiments, the user device 102, the web server 110, the call center server 112, the transaction server 114, the API server 122, the audio processing device 124, and the third-party server 126, as depicted in FIG. 1, may have a similar structure and components that are similar to those described with respect to manipulation detection module 120 shown in FIG. 2. As shown, the manipulation detection module 120 may include a processor 210, an input/output ("I/O") device 220, a memory 230 containing an operating system ("OS") 240 and a program 250. In certain example implementations, the manipulation detection module 120 may be a single server or may be configured as a distributed computer system including multiple servers or computers that interoperate to perform one or more of the processes and functionalities associated with the disclosed embodiments. In some embodiments, the manipulation detection module 120 may further include a peripheral interface, a transceiver, a mobile network interface in communication with the processor 210, a bus configured to facilitate communication between the various components of the manipulation detection module 120, and a power source configured to power one or more components of the manipulation detection module 120.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 230.

The processor 210 may be one or more known processing devices, such as, but not limited to, a microprocessor from the Pentium™ family manufactured by Intel™ or the Turion™ family manufactured by AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the manipulation detection module 120 may include one or more storage devices configured to store information used by the processor 210 (or other components) to perform certain functions related to the disclosed embodiments. In one example, the manipulation detection module 120 may include the memory 230 that includes instructions to enable the processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the manipulation detection module 120 may include a memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, the manipulation detection module 120 may include the memory 230 that may include one or more programs 250 to perform one or more functions of the disclosed embodiments. For example, in some embodiments, the manipulation detection module 120 may additionally manage dialogue and/or other interactions with the user via a program 250.

In certain example implementations, the program 250 that may include a rule-based platform 290 for determining a risk tier of a user-initiated request in accordance with a set of predefined rules. In some embodiments, the manipulation detection module 120 may include a trained machine learning model 295 for analyzing vocal samples received from a user and determining a command or user-initiated request based on applying natural language processing techniques to the received vocal samples/utterances. Moreover, the processor 210 may execute one or more programs 250 located remotely from the system 100 (such as the system shown in FIG. 1). For example, the system 100 may access one or more remote programs 250 (such as the rule-based platform 290 or the trained machine learning model 295), that, when executed, perform functions related to disclosed embodiments.

According to some embodiments, the trained machine learning model 295 may be trained by updating an audio processing database 174 (as discussed above with respect to FIG. 1) with communications from users that have been labeled using, for example, a web user interface. The data in the audio processing database 174 may undergo supervised training in a neural network model using a neural network training algorithm while the model is offline before being deployed in the system 100. According to some embodiments, a natural language processing model of the system 100 may utilize deep learning models such as a convolutional neural network (CNN) and long short-term memory (LS™). The natural language processing model may also be trained to recognize named entities in addition to intents. For example, a named entity may include persons, places, organizations, account types, and product types. According to some embodiments, when the manipulation detection module 120 generates a command, it may determine an entity that will execute the command, such as, for example, the API server 122, the audio processing device 124, or some other device or component. According to some embodiments, at the time the manipulation detection module 120 generates a new command, the manipulation detection module 120 may also update the user information database 260 (or alternatively, external database 118) with information about a previous or concurrent transaction or user interaction.

The memory 230 may include one or more memory devices that store data and instructions used to perform one or more features of the disclosed embodiments. The memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 230 may include software components that, when executed by the processor 210, perform one or more processes consistent with the disclosed embodiments. In some embodiments, the memory 230 may include a user information database 260 for storing related data to enable the manipulation detection module 120 to perform one or more of the processes and functionalities associated with the disclosed embodiments.

The user information database 260 may include stored data relating to a user or customer profile and user or customer accounts, such as for example, user identification, name, age, sex, birthday, address, account status, preferences, preferred language, greeting name, preferred communication channel, account numbers, order history, delivery history, authorized users associated with one or more accounts, account balances, account payment history, and other such typical account information. The user information database 260 may further include stored data relating to previous interactions between the organization (or its related entity) and a user. For example, the user information database 260 may store user interaction data that includes records of previous interactions with a user via a website, SMS, a chat program, a mobile application, an IVR system, or notations taken after speaking with a customer service agent. The user information database 260 may also include information about business transactions between the organization (or its related entity) and a user or customer that may be obtained from, for example, the transaction server 114.

The user information database 260 may also include user feedback data such as an indication of whether an automated interaction with a user was successful, online surveys filled out by a user, surveys answered by a user following previous interactions to the company, digital feedback provided through websites or mobile applications associated with the organization or its related entity (e.g., selecting a smiley face or thumbs up to indicate approval), reviews written by a user, complaint forms filled out by a user, information obtained from verbal interactions with user (e.g., information derived from a transcript of a customer service call with a user or customer that is generated using, for example, voice recognition techniques and/or by audio processing device 124) or any other types of communications from a user or customer to the organization or its related entity. According to some embodiments, the functions provided by the user information database may also be provided by a database that is external to the manipulation detection module 120, such as the database 118 as shown in FIG. 1.

The manipulation detection module 120 may also be communicatively connected to one or more memory devices (e.g., databases) locally or through a network. The remote memory devices may be configured to store information and may be accessed and/or managed by the manipulation detection module 120. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The manipulation detection module 120 may also include one or more I/O devices 220 that may comprise one or more interfaces for receiving signals or input from devices and providing signals or output to one or more devices that allow data to be received and/or transmitted by the manipulation detection module 120. For example, the manipulation detection module 120 may include interface components, which may provide interfaces to one or more input devices, such as one or more keyboards, mouse devices, touch screens, track pads, trackballs, scroll wheels, digital cameras, microphones, sensors, and the like, that enable the manipulation detection module 120 to receive data from one or more users (such as, for example, via the user device 102).

In example embodiments of the disclosed technology, the manipulation detection module 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the manipulation detection module 120 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the manipulation detection module 120 may include a greater or lesser number of components than those illustrated.

Figure 3:
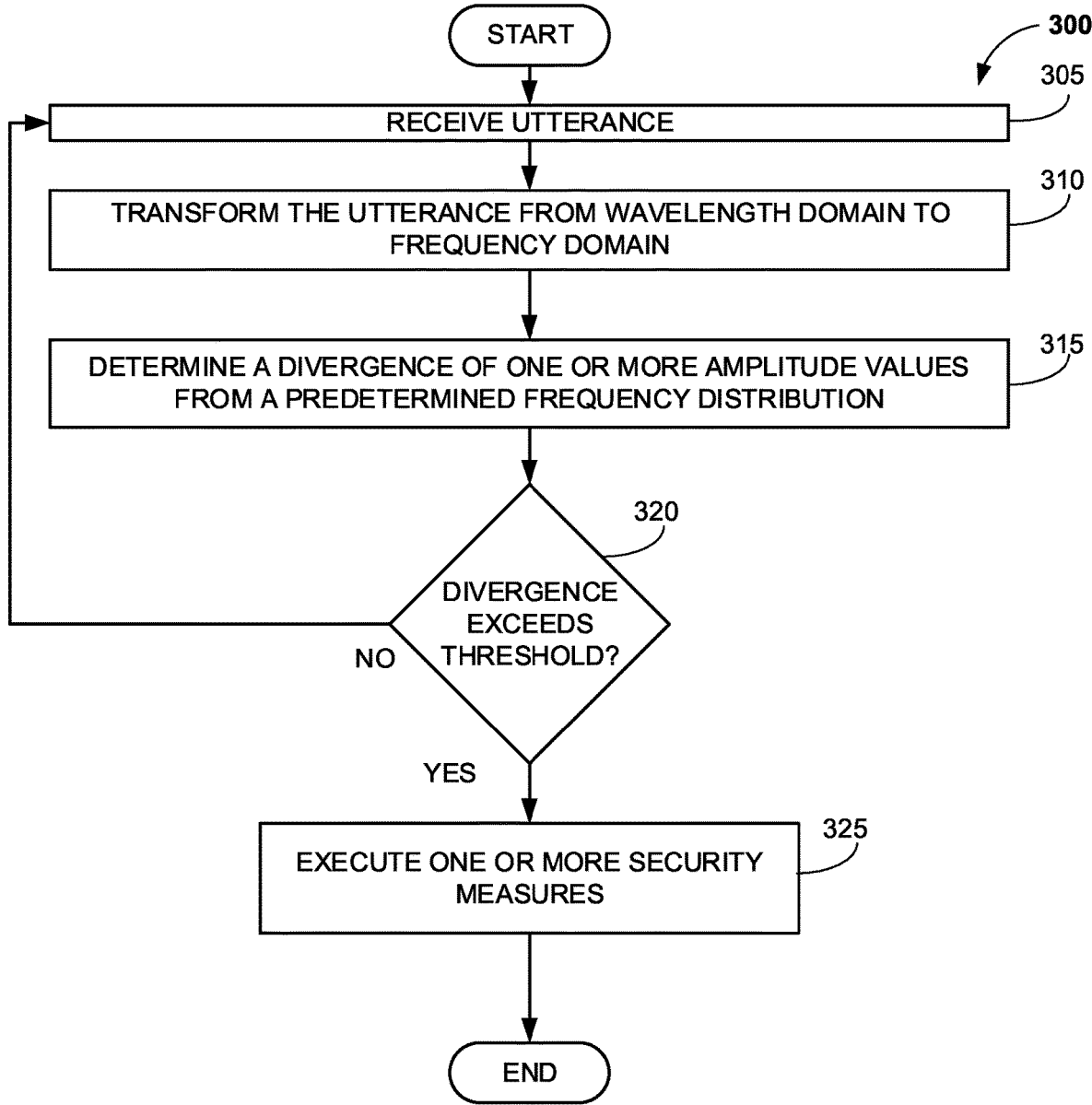
FIG. 3 is a flow diagram 300 illustrating examples of methods for detecting manipulated vocal audio, in accordance with certain embodiments of the disclosed technology.

FIG. 3 is a flow diagram 300 illustrating examples of methods for detecting manipulated vocal audio, in accordance with certain embodiments of the disclosed technology. As shown in step 305 of method 300, the system may receive an utterance from a user. For example, a user of system 100 may contact call center server 112 in order to request an action from the system (e.g., authenticating a transaction initiated via transaction server 114, validation of a user login initiated via web server 110, etc.). The user may contact call center server 112 and call center server 112 may provide an IVR response system to the user to request the user for the reason for the call. Accordingly, the user may provide an utterance to the system which the system may interpret to provide the requested action. According to certain embodiments, the utterance may comprise both (i) a request for a service or action from system 100 and (ii) a vocal sample that may be analyzed to determine whether the vocal sample is manipulated.

In step 310, the system (e.g., audio processing device 124) may transform the utterance from a wavelength domain to a frequency domain. According to some embodiments, the system may implement one of a Fourier transformation, a fast Fourier transformation, a short-time Fourier transformation, or a discrete cosine transformation in order to transform the vocal sample from a wavelength domain to a frequency domain. According to some embodiments, when transforming the received vocal sample using the short-time Fourier transformation, the system sets a window function that allows the system to sample the received utterance at a predetermined sampling rate to determine a series of overlapping discrete signal components in the wavelength domain. The system may apply a Fourier transformation to each of the plurality of overlapping discrete signal components and determine a plurality of amplitudes in the frequency domain associated with the overlapping discrete signal components in the wavelength domain.

In step 315, the system may determine a divergence of one or more amplitude values from a predetermined frequency distribution. For example, once the utterance and/or vocal sample has been transformed into the frequency domain, the transformed frequency domain data may include a plurality of amplitude values distributed across a plurality of frequency values. According to some embodiments, the transformed vocal sample may be represented by a spectrogram. A spectrogram may show frequency values along a first axis, time values associated with the vocal sample along a second axis, and amplitude values (e.g., loudness of a given frequency at a given time) along a third axis. The system may (e.g., via manipulation detection module 120) may determine whether the amplitude values diverge from a predetermined frequency distribution. For example, according to some embodiments, the amplitude (e.g., loudness) values of human vocal frequencies follow a predetermined distribution of leading digits. According to some embodiments, the predetermined distribution is a Benford's distribution. According to some embodiments, the system (e.g., via manipulation detection module 120 and/or audio processing device 124) may isolate a plurality of amplitude values representative of the utterance received in step 305 and determine whether the leading digits frequency distribution of the selected amplitude values diverge from a predetermined distribution. In other embodiments, the system (e.g., manipulation detection module 120 and/or audio processing device 124) may operate on all of the amplitude values of the utterance received in step 305 to determine whether the leading digits frequency distribution diverges from a predetermined distribution.

In decision block 320, the system (e.g. manipulation detection module 120) may determine whether the divergence between the selected amplitude values and the predetermined distribution exceeds a predetermined threshold. In some embodiments, the predetermined threshold may be a predetermined p-value. In some embodiments, the predetermined p-value may be p=0.05, although the system may use any p-value to determine whether the divergence from the predetermined threshold is statistically significant. According to some embodiments, the determination comprises determining whether the divergence between the selected amplitude values and a Benford's distribution for leading digits exceeds a predetermined threshold. According to some embodiments, when the divergence exceeds the predetermined threshold, the system determines that the received utterance has been manipulated. When the divergence does not exceed the predetermined threshold, the system may return to step 305 to listen for a new utterance, and run a similar analysis on the next utterance received from the user. When the divergence exceeds the predetermined threshold, the system may move to step 325. According to some embodiments, the divergence calculation may further comprise one of a Jensen-Shannon divergence, a Kullback-Leibler divergence, a symmetrized Renyi divergence, a symmetrized Tsallis divergence, and/or a Kolmogorov-Smirnov test.

In step 325, the system (e.g. manipulation detection module 120) may execute one or more security measures. According to some embodiments, the one or more security measures may include (i) transferring the user from an automated operator to a human operator, (ii) requiring second factor authentication from the user, and/or (iii) denying a user-initiated request. For example, depending on a risk tier of the user request, the system may execute a different type of security measure. For example, if the user request is associated with a first risk tier (e.g., highest risk) the system may deny the user-initiated request. If the user request is associated with a second risk tier (e.g., medium risk) then the system may transform the user to a human operator (e.g., via call center server 112). When the risk tier is associated with a third risk tier (e.g., lower risk) the system may request second factor authentication from the user before allowing the user-initiated request. According to some embodiments, the determined risk tier of the user request may be based in part on the statistical significance of the divergence. For example, when the statistical significance of the divergence is at a highest level, the system may determine that the user-initiated request may be associated with the highest risk tier. In some embodiments, the determined risk tier may be based in part on the specific user-initiated request. For example, a user-initiated request to check an account balance may be assigned a lower risk tier than a user-initiated request to change a password or security PIN associated with the user's account. After step 325, method 300 may end.

Figure 4:
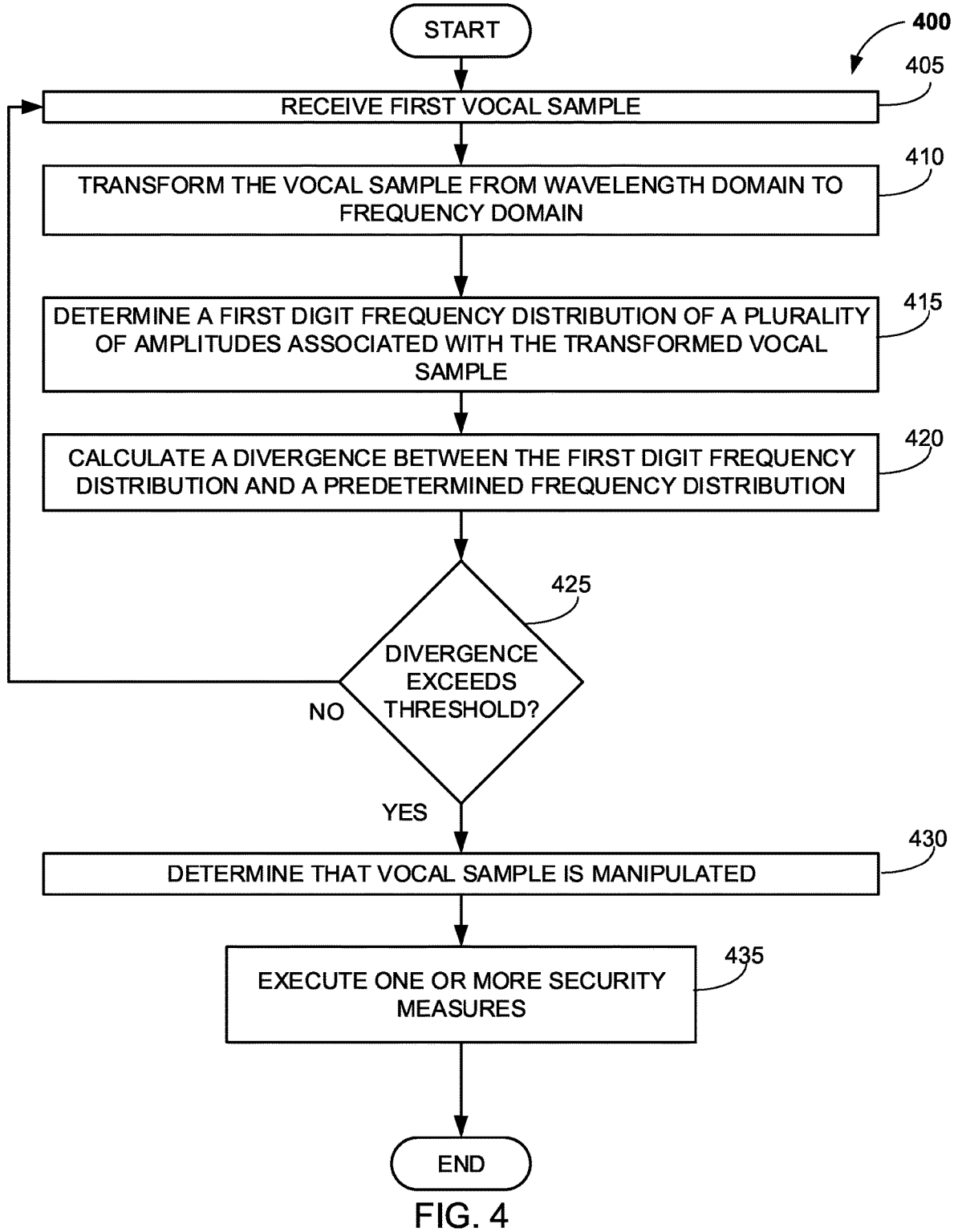
FIG. 4 is a flow diagram 400 illustrating examples of methods for detecting manipulated vocal audio, in accordance with certain embodiments of the disclosed technology.

FIG. 4 is a flow diagram 400 illustrating examples of methods for detecting manipulated vocal audio, in accordance with certain embodiments of the disclosed technology. As shown in step 405 of method 400, the system may receive a first vocal sample. The first vocal sample may be received from a user requesting an action from the system (e.g., authenticating a transaction initiated via transaction server 114, validation of a user login initiated via web server 110, etc.). The user may contact call center server 112 and call center server 112 may provide an IVR response system to the user to request the user for the reason for the call. Accordingly, the user may provide an utterance to the system which the system may interpret to provide the requested action. According to certain embodiments, the utterance may comprise both (i) a request for a service or action from system 100 and (ii) a vocal sample that may be analyzed to determine whether the vocal sample is manipulated.

In step 410, the system (e.g., audio processing device 124) may transform the vocal sample from the wavelength domain to the frequency domain. The transformation may be accomplished by one of a Fourier transformation, a fast Fourier transformation, a short-time Fourier transformation, and/or a discrete cosine transformation. According to some embodiments, when transforming the received vocal sample using the short-time Fourier transformation, the system sets a window function that allows the system to sample the received utterance at a predetermined sampling rate to determine a series of overlapping discrete signal components in the wavelength domain. The system may apply a Fourier transformation to each of the plurality of overlapping discrete signal components and determine a plurality of amplitudes in the frequency domain associated with the overlapping discrete signal components in the wavelength domain.

In step 415, the system (e.g., manipulation detection module 120) may determine a first digit frequency distribution of a plurality of amplitudes associated with the transformed vocal sample. For example, once the utterance and/or vocal sample has been transformed into the frequency domain, the transformed frequency domain data may include a plurality of amplitude values distributed across a plurality of frequency values. According to some embodiments, the transformed vocal sample may be represented by a spectrogram. A spectrogram may show frequency values along a first axis, time values associated with the vocal sample along a second axis, and amplitude values (e.g., loudness of a given frequency at a given time) along a third axis. The system may (e.g., via audio processing device 124 and/or manipulation detection module 120) select a plurality of amplitudes associated with the received vocal sample and determine their first digit frequency distribution. For example, amplitude values may be measured in decibels and the leading digit of any given amplitude value may be any digit from 1 to 9. However, authentic vocal samples predominantly will have first digit frequency values represented by a 1, in accordance with Benford's distribution.

In step 420, the system (e.g., manipulation detection module 120) may calculate a divergence between the first digit frequency distribution of the selected amplitude values and a predetermined frequency distribution. The system may (e.g., via manipulation detection module 120) determine whether the amplitude values diverge from a predetermined frequency distribution. In some embodiments, the predetermined threshold may be a predetermined p-value. In some embodiments, the predetermined p-value may be p=0.05, although the system may use any p-value to determine whether the divergence from the predetermined threshold is statistically significant. For example, according to some embodiments, the amplitude (e.g., loudness) values of certain human vocal frequencies follow a predetermined distribution of leading digits. According to some embodiments, the predetermined distribution is a Benford's distribution. Accordingly, the system (e.g., via manipulation detection module 120 and/or audio processing device 124) may isolate a plurality of amplitude values representative of the vocal sample received in step 405 and determine whether the leading digits frequency distribution of the selected amplitude values diverge from a predetermined distribution. In other embodiments, the system (e.g., manipulation detection module 120 and/or audio processing device 124) may operate on all of the amplitude values of the vocal sample received in step 405 to determine whether the leading digits frequency distribution diverges from a predetermined distribution.

In decision block 425, the system (e.g. manipulation detection module 120) may determine whether the divergence between the selected amplitude values and the predetermined distribution exceeds a predetermined threshold. According to some embodiments, the determination comprises determining whether the divergence between the selected amplitude values and a Benford's distribution for leading digits exceeds a predetermined threshold. According to some embodiments, when the divergence exceeds the predetermined threshold, the system determines that the received utterance has been manipulated. When the divergence does not exceed the predetermined threshold, the system may return to step 405 to listen for a second vocal sample, and run a similar analysis on the next vocal sample received from the user. When the divergence exceeds the predetermined threshold, the system may move to step 430. According to some embodiments, the divergence calculation may further comprise one of a Jensen-Shannon divergence, a Kullback-Leibler divergence, a symmetrized Renyi divergence, a symmetrized Tsallis divergence, or a Kolmogorov-Smirnov test. In step 430, the system may determine that the vocal sample is manipulated when the divergence between the first digit frequency distribution of the selected amplitude values and the predetermined distribution exceeds a predetermined threshold. In response to the determination, the system (e.g., manipulation detection module 120) may execute one or more security measures in step 430.

According to some embodiments, the one or more security measures may include (i) transferring the user from an automated operator to a human operator, (ii) requiring second factor authentication from the user, and/or (iii) denying a user-initiated request. For example, depending on a risk tier of the user request, the system may execute a different type of security measure. For example, if the user request is associated with a first risk tier (e.g., highest risk) the system may deny the user-initiated request. If the user request is associated with a second risk tier (e.g., medium risk) then the system may transform the user to a human operator (e.g., via call center server 112). When the risk tier is associated with a third risk tier (e.g., lower risk) the system may request second factor authentication from the user before allowing the user-initiated request. According to some embodiments, the determined risk tier of the user request may be based in part on the statistical significance of the divergence. For example, when the statistical significance of the divergence is at a highest level, the system may determine that the user-initiated request may be associated with the highest risk tier. In some embodiments, the determined risk tier may be based in part on the specific user-initiated request. For example, a user-initiated request to check an account balance may be assigned a lower risk tier than a user-initiated request to change a password or security PIN associated with the user's account. After step 430, method 400 may end.

Figure 5:
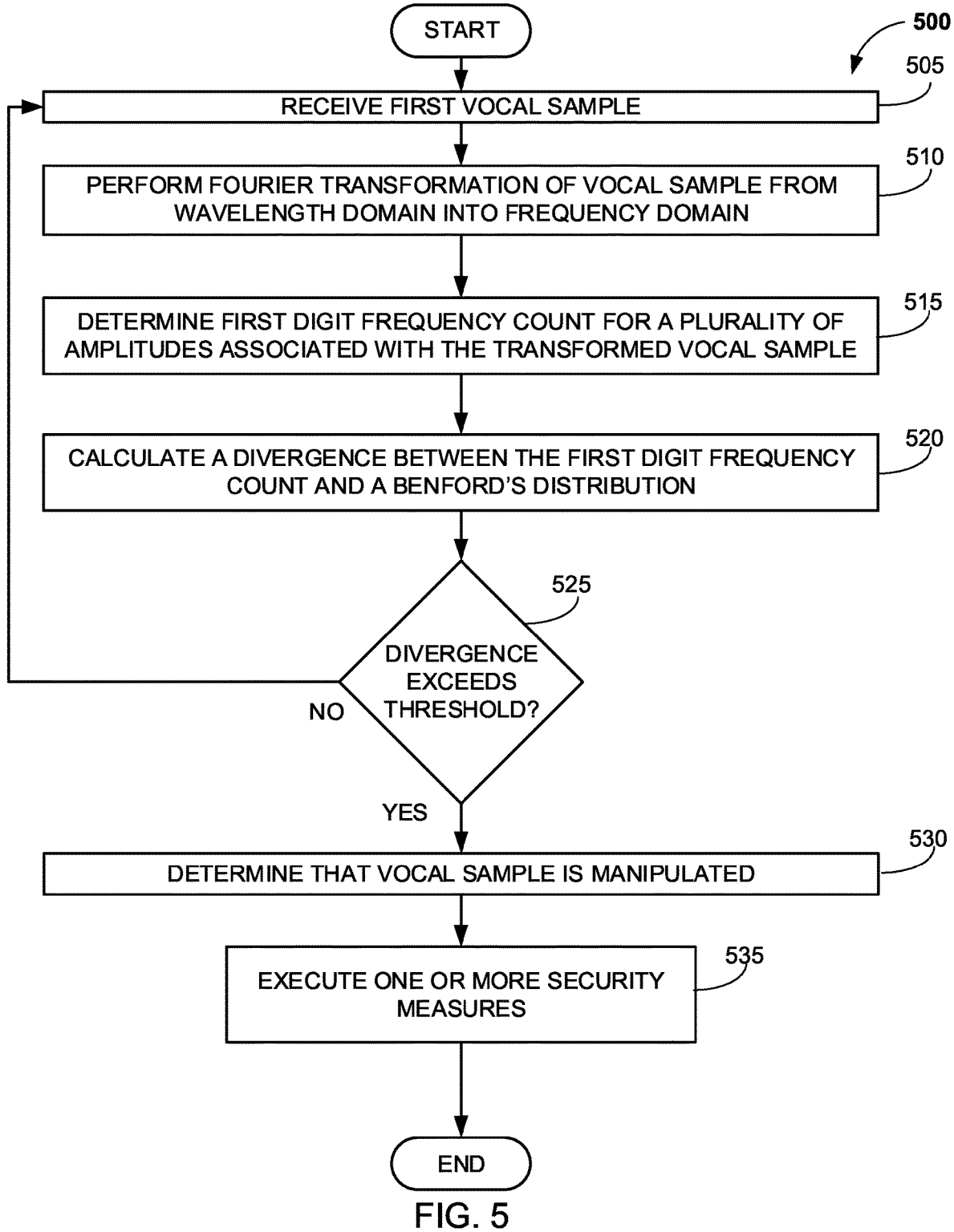
FIG. 5 is a flow diagram 500 illustrating examples of methods for detecting manipulated vocal audio, in accordance with certain embodiments of the disclosed technology.

FIG. 5 is a flow diagram 500 illustrating examples of methods for detecting manipulated vocal audio, in accordance with certain embodiments of the disclosed technology. As shown in step 505 of method 500, the system may receive a first vocal sample. The first vocal sample may be received from a user requesting an action from the system (e.g., authenticating a transaction initiated via transaction server 114, validation of a user login initiated via web server 110, etc.). The user may contact call center server 112 and call center server 112 may provide an IVR response system to the user to request the user for the reason for the call. Accordingly, the user may provide an utterance to the system which the system may interpret to provide the requested action. According to certain embodiments, the utterance may comprise both (i) a request for a service or action from system 100 and (ii) a vocal sample that may be analyzed to determine whether the vocal sample is manipulated.

In step 510, the system (e.g., audio processing device 124) may transform the vocal sample from the wavelength domain to the frequency domain. The transformation may be accomplished by one of a Fourier transformation, a fast Fourier transformation, a short-time Fourier transformation, and/or a discrete cosine transformation. According to some embodiments, when transforming the received vocal sample using the short-time Fourier transformation, the system sets a window function that allows the system to sample the received utterance at a predetermined sampling rate to determine a series of overlapping discrete signal components in the wavelength domain. The system may apply a Fourier transformation to each of the plurality of overlapping discrete signal components and determine a plurality of amplitudes in the frequency domain associated with the overlapping discrete signal components in the wavelength domain.

In step 515, the system (e.g., manipulation detection module 120) may determine a first digit frequency distribution of a plurality of amplitudes associated with the transformed vocal sample. For example, once the utterance and/or vocal sample has been transformed into the frequency domain, the transformed frequency domain data may include a plurality of amplitude values distributed across a plurality of frequency values. According to some embodiments, the transformed vocal sample may be represented by a spectrogram. A spectrogram may show frequency values along a first axis, time values associated with the vocal sample along a second axis, and amplitude values (e.g., loudness of a given frequency at a given time) along a third axis. The system may (e.g., via audio processing device 124 and/or manipulation detection module 120) select a plurality of amplitudes associated with the received vocal sample and determine their first digit frequency distribution. For example, amplitude values may be measured in decibels and the leading digit of any given amplitude value may be any digit from 1 to 9. However, authentic vocal samples predominantly will have first digit frequency values represented by a 1, in accordance with Benford's distribution.

In step 520, the system (e.g., manipulation detection module 120) may calculate a divergence between the first digit frequency distribution of the selected amplitude values and a Benford's frequency distribution. The system may (e.g., via manipulation detection module 120) determine whether the amplitude values diverge from a predetermined frequency distribution. For example, according to some embodiments, the amplitude (e.g., loudness) values of human vocal frequencies follow a predetermined distribution of leading digits. According to some embodiments, the system (e.g., via manipulation detection module 120 and/or audio processing device 124) may isolate a plurality of amplitude values representative of the vocal sample received in step 405 and determine whether the leading digits frequency distribution of the selected amplitude values diverge from a predetermined distribution. In other embodiments, the system (e.g., manipulation detection module 120 and/or audio processing device 124) may operate on all of the amplitude values of the utterance received in step 305 to determine whether the leading digits frequency distribution diverges from a predetermined distribution.

In decision block 525, the system (e.g. manipulation detection module 120) may determine whether the divergence between the selected amplitude values and the Benford's distribution exceeds a predetermined threshold. According to some embodiments, the determination comprises determining whether the divergence between the selected amplitude values and a Benford's distribution for leading digits exceeds a predetermined threshold. In some embodiments, the predetermined threshold may be a predetermined p-value. In some embodiments, the predetermined p-value may be p=0.05, although the system may use any p-value to determine whether the divergence from the predetermined threshold is statistically significant. According to some embodiments, when the divergence exceeds the predetermined threshold, the system determines that the received utterance has been manipulated. When the divergence does not exceed the predetermined threshold, the system may return to step 505 to listen for a second vocal sample, and run a similar analysis on the next vocal sample received from the user. When the divergence exceeds the predetermined threshold, the system may move to step 530. According to some embodiments, the divergence calculation may further comprise one of a Jensen-Shannon divergence, a Kullback-Leibler divergence, a symmetrized Renyi divergence, a symmetrized Tsallis divergence, or a Kolmogorov-Smirnov test. In step 530, the system may determine that the vocal sample is manipulated when the divergence between the first digit frequency distribution of the selected amplitude values and the predetermined distribution exceeds a predetermined threshold. In response to the determination, the system (e.g., manipulation detection module 120) may execute one or more security measures in step 535.

According to some embodiments, the one or more security measures may include (i) transferring the user from an automated operator to a human operator, (ii) requiring second factor authentication from the user, and/or (iii) denying a user-initiated request. For example, depending on a risk tier of the user request, the system may execute a different type of security measure. For example, if the user request is associated with a first risk tier (e.g., highest risk) the system may deny the user-initiated request. If the user request is associated with a second risk tier (e.g., medium risk) then the system may transform the user to a human operator (e.g., via call center server 112). When the risk tier is associated with a third risk tier (e.g., lower risk) the system may request second factor authentication from the user before allowing the user-initiated request. According to some embodiments, the determined risk tier of the user request may be based in part on the statistical significance of the divergence. For example, when the statistical significance of the divergence is at a highest level, the system may determine that the user-initiated request may be associated with the highest risk tier. In some embodiments, the determined risk tier may be based in part on the specific user-initiated request. For example, a user-initiated request to check an account balance may be assigned a lower risk tier than a user-initiated request to change a password or security PIN associated with the user's account. After step 530, method 500 may end.

Figure 6:
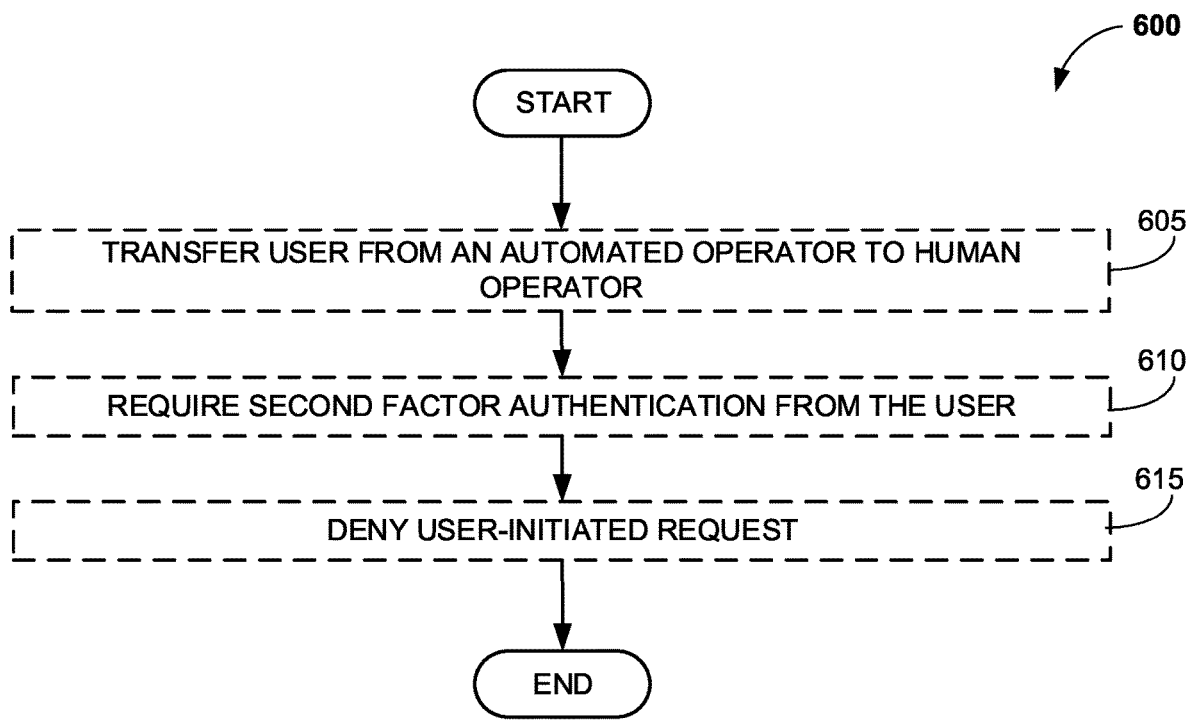
FIG. 6 is a flow diagram 600 illustrating example methods for executing one or more security measures in response to detecting manipulated vocal audio, in accordance with certain embodiments of the disclosed technology.

FIG. 6 is a flow diagram 600 illustrating example methods for executing one or more security measures in response to detecting manipulated vocal audio, in accordance with certain embodiments of the disclosed technology. As shown in step 605 of method 600, the one or more security measures may include transferring the user from an automated operator (e.g., facilitated by call center server 112 with an IVR system) to a human operator. As shown in step 610, the one or more security measures may include requiring second factor authentication from the user before authorizing the user-initiated request. As shown in the step 615, the one or more security measures may include denying the user-initiated request.

Figure 7:
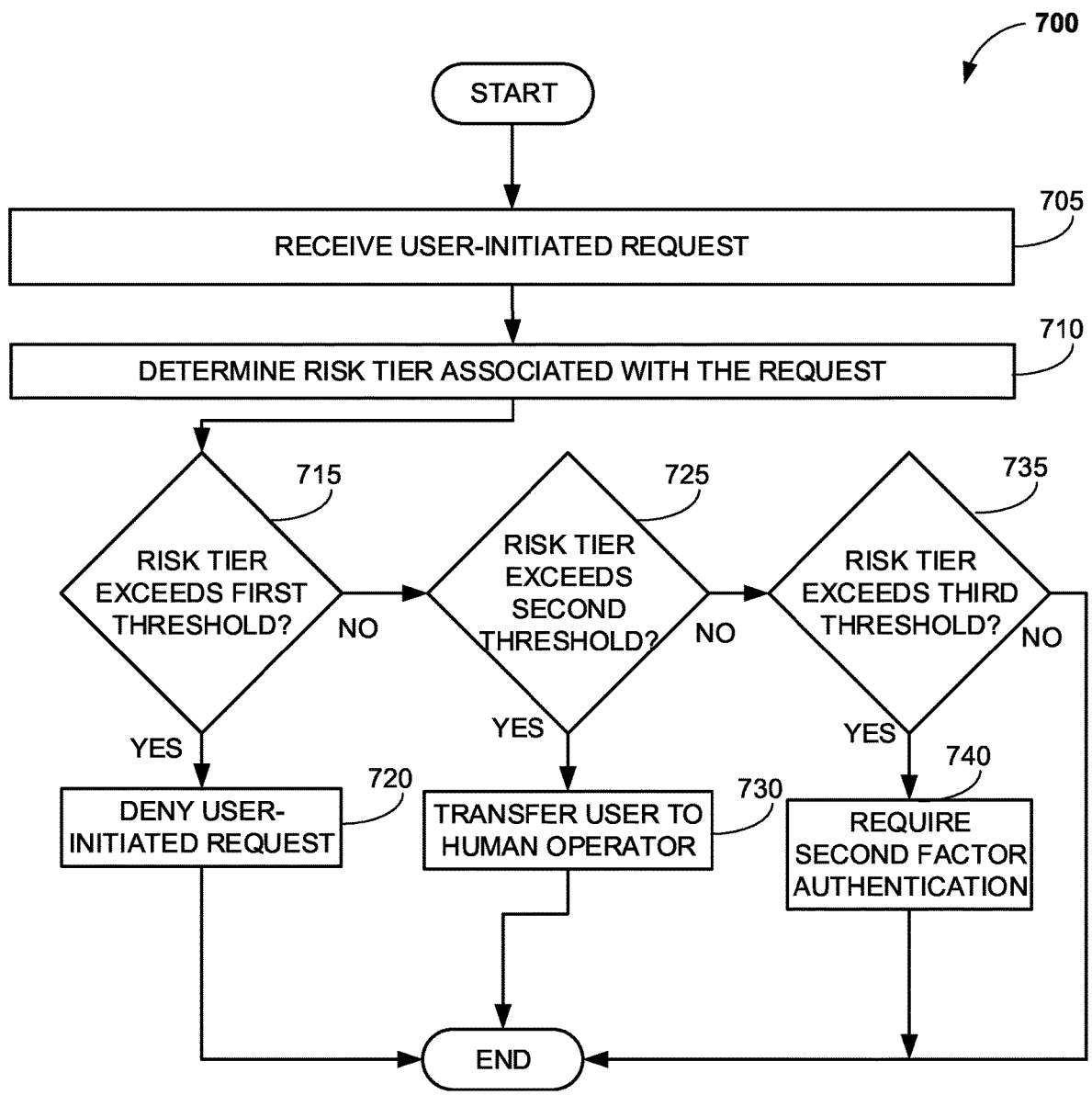
FIG. 7 is a flow diagram 700 illustrating example methods for determining a risk tier associated with a user request and executing one or more security measures, in accordance with certain embodiments of the disclosed technology.

FIG. 7 is a flow diagram 700 illustrating example methods for determining a risk tier associated with a user request and executing one or more security measures after determining that a vocal sample is manipulated, in accordance with certain embodiments of the disclosed technology. For example, depending on a risk tier of the user request, the system may execute a different type of security measure. For example, if the user request is associated with a first risk tier (e.g., highest risk) the system may deny the user-initiated request (e.g., the manipulation detection module 120 may issue one or more commands to API server 122, which may transmit instructions to one of transaction server 114 to deny a transaction, web server 110 to deny a login request, or call server 112 to deny access to sensitive information associated with a user account). If the user request is associated with a second risk tier (e.g., medium risk) then the system may transform the user to a human operator (e.g., manipulation detection module 120 may issue one or more commands to API server 122, which may transmit instructions to call center server 112). When the risk tier is associated with a third risk tier (e.g., lower risk) the system may request second factor authentication from the user before allowing the user-initiated request (e.g., manipulation detection module 120 may transmit instructions to API server 122, which may transmit instructions to one of web server 110, call center server 112, or transaction server 114 to request second factor authentication from the user). In step 705 of method 700, the system (e.g., audio processing device 124) may receive a user-initiated request. For example, a user of system 100 may contact call center server 112 in order to request an action from the system (e.g., authenticating a transaction initiated via transaction server 114, validation of a user login initiated via web server 110, etc.). Audio processing device 124 may use natural language processing methods to determine the user-initiated request, and after the vocal sample representative of the user-initiated has been processed and transformed (e.g., by audio processing device 124), the frequency domain data may be transmitted to manipulation detection module 120. Manipulation detection module 120 may determine the risk tier associated with the request based in part on the first digit frequency distribution of a plurality of amplitude values as described in more detail with respect to FIGS. 3-5 in step 710. Accordingly, in decision block 715, when the divergence between the first digit frequency distribution of amplitudes exceeds a predetermined threshold, the system (e.g., manipulation detection module 120) may determine whether the risk tier of the user-initiated request exceeds a first threshold (e.g., belongs to a first risk tier). When the system determines that the user-initiated request is associated with the first risk tier, (e.g., exceeds a first threshold) the system (e.g., manipulation detection module 120) may deny the user-initiated request in step 720.

When the system determines that the user-initiated request is not associated with the first risk tier (e.g., risk tier does not exceed the first threshold) the system may move to decision block 725. In decision block 725, the system (e.g., manipulation detection module 120) may determine whether the risk tier of the user-initiated request exceeds a second threshold (e.g., belongs to a second risk tier). When the system determines that the user-initiated request is associated with the second risk tier, (e.g., exceeds a second threshold) the system (e.g., manipulation detection module 120) may transfer the user to a human operator in step 730. For example, manipulation detection module 120 may transmit instructions to cell center server 112 to transfer the user from an IVR system operator to a human operator.

When the system determines that the user-initiated request is not associated with the second risk tier (e.g., risk tier does not exceed the second threshold) the system may move to decision block 735. In decision block 735, the system (e.g., manipulation detection module 120) may determine whether the risk tier of the user-initiated request exceeds a third threshold (e.g., belongs to a third risk tier). When the system determines that the user-initiated request is associated with the third risk tier, (e.g., exceeds a third threshold) the system (e.g., manipulation detection module 120) may require second factor authorization from the user before authorizing the user-initiated request in step 740. For example, manipulation detection module 120 may transmit instructions to transaction server 114 to request second factor authorization from the user before completing a transaction associated with the user-initiated request. Similarly, manipulation detection module 120 may transmit instructions to web server 110 to require second factor authorization before completing a login request or change password request associated with the user-initiated request.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

EXEMPLARY USE CASES

A user or customer may place a call to system 100 (e.g., via call center server 112) in order to verify a purchase, change a password, request a change to an account, etc. The user may be connected to an IVR system which may request the user explain why he or she is calling. The system (e.g., audio processing device 124) may receive a user utterance in which the user explains the reason for his or her call. Audio processing device 124 may derive the meaning behind the user request using predetermined rules and natural language processing techniques (e.g., using rule-based platform 290 and/or trained machine learning model 295). Additionally, the same vocal sample may be analyzed in real-time by the system as an additional security measure, to prevent unauthorized account access. For example, audio processing device 124 may transform the received utterance from the user from a wavelength domain into a frequency domain, and may additionally construct a spectrogram using the transformed audio sample. The transformation may occur in substantially real-time. Once the vocal sample has been transformed, the transformed data may be passed to manipulation detection module 120. Manipulation detection module 120 may identify and isolate a plurality of amplitude values that are associated with certain frequencies of human speech. The system may compare the leading digit values of the selected amplitudes to a Benford's distribution. If the voice is manipulated, the leading digits of the selected amplitudes will diverge from a Benford's distribution, which predicts that the leading digit should be represented by the digit "1" approximately 30% of the time. When the system detects that the leading digits of the selected amplitude values diverge from the expected values, the system (e.g., manipulation detection module 120) may transmit instructions to one or more components of system 100 to execute one or more security measures, which may include denying the user-initiated request. When the system determines that the leading digits of the selected amplitude values do not diverge from the expected values according to Benford's distribution, the system may authorize the user-initiated request. Additionally, the analyzed vocal sample may be stored by the system (e.g., on one of database 174, database 260, database 118, etc.) and be stored as a authentication fingerprint against subsequent vocal samples/utterances from the user may be compared to in order to authenticate the user on a subsequent call.

Examples of the present disclosure relate to systems and methods for detecting manipulated vocal audio. In one aspect, a system for detecting manipulated vocal audio is disclosed. The system may implement a method according to the disclosed embodiments. The system may include one or more processors and a memory in communication with the one or more processors and storing instructions that, when executed by the one or more processors are configured to cause the system to perform steps of a method. The system may receive a communication including a first utterance of a user. The system may transform the first utterance from a wavelength domain to a frequency domain. The system may determine a divergence of one or more amplitude values of the transformed frequency domain from a predetermined frequency distribution. The system may execute one or more security measures when the divergence exceeds a predetermined threshold.

In some embodiments, the transformation may further include at least one of a Fourier transformation, a fast Fourier transformation, a short-time Fourier transformation, or a discrete cosine transformation. In some embodiments, the predetermined frequency distribution may include a Benford's distribution.

In some embodiments, the one or more security measures may include at least one action selected from (i) transferring the user from an automated operator to a human operator, (ii) requiring second factor authentication from the user, and (iii) denying a user-initiated request.

In some embodiments, the transformation may further include sampling the communication at a predetermined sampling rate to create a plurality of overlapping discrete signal components, applying a Fourier transformation to each of the plurality of overlapping discrete signal components, and determining a plurality of amplitudes associated with the overlapping discrete signal components.

In some embodiments, determining the divergence may further include determining a first digit frequency distribution of the plurality of amplitudes and calculating a divergence between the first digit frequency distribution and a predetermined frequency distribution.

In some embodiments, the predetermined threshold may be based in part on a risk tier associated with a user-initiated request. In some embodiments, the divergence includes one of a Jensen-Shannon divergence, a Kullback-Leibler divergence, a symmetrized Renyi divergence, and a symmetrized Tsallis divergence.

In another aspect, a method for detecting manipulated vocal audio is disclosed. The method may include receiving a first vocal sample associated with a user. The method may include transforming the first vocal sample from a wavelength domain into a frequency domain. The method may include determining a first digit frequency distribution of a plurality of amplitudes associated with the transformed vocal sample. The method may include calculating a divergence between the first digit frequency distribution and a predetermined frequency distribution. The method may include determining that the first vocal sample is manipulated when the divergence exceeds a predetermined threshold. The method may include executing one or more security measures in response to determining that the first vocal sample is manipulated.

In some embodiments, the transformation may further include at least one of a Fourier transformation, a fast Fourier transformation, a short-time Fourier transformation, or a discrete cosine transformation. In some embodiments, the predetermined frequency distribution includes a Benford's distribution. In some embodiments, the one or more security measures includes transferring the user from an automated operator to a human operator. In some embodiments, the one or more security measures include requiring second factor authentication from the user. In some embodiments, the one or more security measures include a denying a user-initiated request.

In some embodiments, the predetermined threshold is based in part on a risk tier associated with a user-initiated request. In some embodiments, the divergence includes one of a Jensen-Shannon divergence, a Kullback-Leibler divergence, a symmetrized Renyi divergence, and a symmetrized Tsallis divergence.

In another aspect, a method for detecting manipulated vocal audio is disclosed. The method may include receiving a first vocal sample associated with a user. The method may include performing a Fourier transformation of the first vocal sample from a wavelength domain into a frequency domain. The method may include determining a first frequency count for a plurality of amplitudes associated with the transformed first vocal sample. The method may include calculating a divergence between the determined first digit frequency count and a Benford's distribution. The method may include determining that the first vocal sample is manipulated when the divergence exceeds a predetermined threshold. The method may include executing one or more security measures in response to determining that the first vocal sample is manipulated.

In some embodiments, the divergence includes one of a Jensen-Shannon divergence, a Kullback-Leibler divergence, a symmetrized Renyi divergence, and a symmetrized Tsallis divergence. In some embodiments, the one or more security measures include at least one action selected from (i) transferring the user from an automated operator to a human operator, (ii) requiring second factor authentication from the user, and (iii) denying a user-initiated request. In some embodiments, the Fourier transformation further includes a short-time Fourier transformation.

The invention claimed is:

1. A system for detecting manipulated vocal audio, comprising:
  one or more processors; and
  memory in communication with the one or more processors and storing instructions that, when executed by the one or more processors, are configured to cause the system to:
    receive a communication comprising a first utterance of a user;
    transform the first utterance from a wavelength domain to a frequency domain;
    determine a divergence of one or more amplitude values of the frequency domain from a predetermined frequency distribution;
    determine whether the communication is associated with a first predefined risk tier, a second predefined risk tier, or a third predefined risk tier;
    when the divergence exceeds a predetermined threshold and the communication is associated with the first predefined risk tier, execute one or more first security measures;
    when the divergence exceeds the predetermined threshold and the communication is associated with the second predefined risk tier, execute one or more second security measures; and
    when the divergence exceeds the predetermined threshold and the communication is associated with the third predefined risk tier, execute one or more third security measures.

2. The system of claim 1, wherein the transformation further comprises at least one of a Fourier transformation, a fast Fourier transformation, a short-time Fourier transformation, or discrete cosine transformation.

3. The system of claim 1, wherein the predetermined frequency distribution comprises a Benford's distribution.

4. The system of claim 1, wherein the one or more first security measures comprise at least one action selected from (i) transferring the user from an automated operator to a human operator, (ii) requiring second factor authentication from the user, and (iii) denying a user-initiated request.

5. The system of claim 1, wherein the transformation further comprises:
  sampling the communication at a predetermined sampling rate to create a plurality of overlapping discrete signal components;
  applying a Fourier transformation to each of the plurality of overlapping discrete signal components; and
  determining a plurality of amplitudes associated with the overlapping discrete signal components.

6. The system of claim 5, wherein determining the divergence further comprises:
  determining a first digit frequency distribution of the plurality of amplitudes; and
  calculating a divergence between the first digit frequency distribution and the predetermined frequency distribution.

7. The system of claim 1, wherein the divergence comprises one of a Jensen-Shannon divergence, a Kullback-Leibler divergence, a symmetrized Renyi divergence, and a symmetrized Tsallis divergence.

8. A method for detecting manipulated vocal audio, the method comprising:
  receiving a first vocal sample associated with a user;
  transforming the first vocal sample from a wavelength domain into a frequency domain;
  determining a first digit frequency distribution of a plurality of amplitudes associated with the transformed first vocal sample;
  calculating a divergence between the first digit frequency distribution and a predetermined frequency distribution;
  determining whether the first vocal sample is associated with a first predefined risk tier, a second predefined risk tier, or a third predefined risk tier;
  determining that the first vocal sample is manipulated when the divergence exceeds a predetermined threshold;
  executing one or more first security measures responsive to determining the first vocal sample is manipulated and the first vocal sample is associated with the first predefined risk tier;
  executing one or more second security measures responsive to determining the first vocal sample is manipulated and the first vocal sample is associated with the second predefined risk tier; and
  executing one or more third security measures responsive to determining the first vocal sample is manipulated and the first vocal sample is associated with the third predefined risk tier.

9. The method of claim 8, wherein the transformation further comprises at least one of a Fourier transformation, a fast Fourier transformation, a short-time Fourier transformation, or a discrete cosine transformation.

10. The method of claim 8, wherein the predetermined frequency distribution comprises a Benford's distribution.

11. The method of claim 8, wherein the one or more second security measures comprise transferring the user from an automated operator to a human operator.

12. The method of claim 8, wherein the one or more third security measures comprise requiring second factor authentication from the user.

13. The method of claim 8, wherein the one or more first security measures comprise denying a user-initiated request.

14. The method of claim 8, wherein the divergence comprises one of a Jensen-Shannon divergence, a Kullback-Leibler divergence, a symmetrized Renyi divergence, and a symmetrized Tsallis divergence.

15. A method for detecting manipulated vocal audio, the method comprising:
  receiving a first vocal sample associated with a user;
  performing a Fourier transformation of the first vocal sample from a wavelength domain into a frequency domain;
  determining a first digit frequency count for a plurality of amplitudes associated with the transformed first vocal sample;
  calculating a divergence between the determined first digit frequency count and a Benford's distribution;
  determining whether the first vocal sample is associated with at least a first of three predefined risk tiers;
  determining that the first vocal sample is manipulated when the divergence exceeds a predetermined threshold; and
  executing one or more security measures responsive to determining the first vocal sample is manipulated and the first vocal sample is associated with at least the first of three predefined risk tiers.

16. The method of claim 15, wherein the divergence comprises one of a Jensen-Shannon divergence, a Kullback-Leibler divergence, a symmetrized Renyi divergence, and a symmetrized Tsallis divergence.

17. The method of claim 15, wherein the one or more security measures comprise at least one action selected from (i) transferring the user from an automated operator to a human operator, (ii) requiring second factor authentication from the user, and (iii) denying a user-initiated request.

18. The method of claim 15, wherein the Fourier transformation further comprises a short-time Fourier transformation.

19. The system of claim 1, wherein the instructions are further configured to cause the system to:
determine a statistical significance of the divergence,
wherein determining whether the communication is associated with the first predefined risk tier, the second predefined risk tier, or the third predefined risk tier is based on the statistical significance.

20. The system of claim 1, wherein the one or more first, second, and third security measures respectively correspond to a first, second, and third security measure type, and wherein the first, second, and third security measure types are all different from each other.

\* \* \* \* \*